United States Patent

Mustakas et al.

[15] 3,639,129
[45] Feb. 1, 1972

[54] PRODUCTION OF VEGETABLE PROTEIN BEVERAGE BASE

[72] Inventors: Gus C. Mustakas; William J. Albrecht; George N. Bookwalter, all of Peoria, Ill.

[73] Assignee: The United States of America as represented by the Secretary of Agriculture

[22] Filed: Apr. 9, 1970

[21] Appl. No.: 27,184

[52] U.S. Cl. ...........................99/64, 99/17, 99/78
[51] Int. Cl. ...................................A23c 11/00
[58] Field of Search...................99/78, 99, 17, 64, 98

[56] References Cited

UNITED STATES PATENTS 3,097,947  7/1963  Kemmerer...................99/64 X
3,288,614  11/1966  Miles..........................99/64

FOREIGN PATENTS OR APPLICATIONS 70,049  10/1960  India

OTHER PUBLICATIONS

D. B. Hand et al., Food Technology, 18, 139–42 (Dec. 1964).
U.S.D.A. Agriculture Res. Serv., Northern Utilization Res. and Dev. Div., Peoria, Ill., Release CA-N-13, Jan. 1961.

Primary Examiner—Morris O. Wolk
Assistant Examiner—Sidney Marantz
Attorney—R. Hoffman and W. Bier

[57] ABSTRACT

A rapid continuous process which utilizes vegetable protein flour to produce a highly nutritive protein beverage base powder that can be easily converted to a liquid product by merely adding water.

5 Claims, No Drawings

PRODUCTION OF VEGETABLE PROTEIN BEVERAGE BASE

A nonexclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to the production of a protein food product that has as its prime object the ability to easily mix with water to give a beverage having high nutritive value, pleasant flavor, and good mouthfeel. A secondary object is to provide a food supplement with a long shelf life. Other uses and objects will be evident from the following description.

Nutritional protein food supplements are essential for the good health and growth of the young especially in areas of the world where protein is in short supply. Vegetable protein beverages such as soy milk have been tested and found acceptable in several areas, and a continuing research effort is being made to improve these products. The main concern is with finding a product that will be adaptable to the tastes of diverse cultures. The basic product must be stable, transportable in the dry form, mixable with flavorings, and dispersible in water.

Soybeans are the major source of vegetable protein beverage supplements, but other edible materials such as peanuts, fish meal, dry peas, lentils, and corn can be made into flours which could be used in beverages. Vegetable protein flour is a product of plant protein which has been ground to pass a 100-mesh screen. This includes flours with and without vegetable fats such as full-fat and defatted soy flour (Proc. Int. Conf. Soybean Protein Foods, ARS, USDA, May 1967).

Processes have been developed that produce protein-rich, highly stable soy flours that have a mild, acceptable flavor, good nutritional properties, and a long shelf life. However, heat treatments used in production of soy flours reduce the solid suspension properties and yield sandlike, hard particles that give very poor mouthfeel when suspended in water. Good mouthfeel is used in this context to mean having a smoothness similar to cow's milk.

Generally, in accordance with the invention we have developed a process by which vegetable protein flours are converted into a dried vegetable protein powder that forms a stable emulsion when mixed with water comprising the following steps:

a. dispersing soybean protein flour in water to make a slurry containing about 20 percent or less solids;
b. reducing the particle size of the flour so about from 5 to 40 microns in diameter by wet milling;
c. homogenizing and emulsifying the wet-milled slurry; and
d. spray drying the resulting emulsion.

We also developed a process for making highly nutritious and palatable dried protein beverage base comprising the same steps as above but adding vegetable fats and emulsifiers to the slurry before wet milling in sufficient quantity to give a protein and fat content similar to cow's milk and to give a slurry containing about 11 to 20 percent solids. Also, flavorings and sweeteners in sufficient quantity to give the final produce a flavor similar to milk were added. This can be done at any step of the process.

The flours used in either process described above can be full-fat soy flour or defatted soy flour. The flavorings used can be milk flavorings, salt, and sucrose. With proper additives the product can be converted to a milk substitute for people who are allergic to cow's milk. With the many flavorings commercially available, it is obvious that a variety of diverse beverages could be formulated using the instant invention. It could also be used as a protein source to be mixed with other foods.

SUMMARY OF THE INVENTION

The preferred starting material used in the process is full-fat soy flour. Defatted soy flour gives an equivalent product with respect to dispersibility and mouthfeel but requires the addition of greater amounts of vegetable fat in the formulation of milk substitutes. Any vegetable protein flour or grits, i.e., flour or grits from oilseeds or other difficulty dispersible protein product, can be processed by this method to produce a highly water-dispersible powder similar to that produced from soy flour. Enough water is added to the starting material to give a 10 to 20 percent by weight flour-water slurry. This ratio of flour to water is specified because thicker slurries, greater than 20 percent flour, clogged the colloid mill and homogenizer used in the examples. However, another kind of mill could be used which might operate with a thicker slurry. Theoretically, the percentage of flour in the slurry could become almost zero since the particles going through the rollers of the mill would still be broken down. However, practical limitations (e.g., removal of the water, volume handled) keep the percentage from going lower than 11 percent by weight flour in water.

A reduction in flour particle size is achieved by wet milling (i.e., milling flour in a hydrated condition) which is exemplified by the following description. The flour-water slurry was run through a mill which can be any one of the many different types used industrially; hammer mills, roller mills, single- and double-disc mills, or disintegrators such as the Rietz type. The clearance of the mechanism through which the slurry will pass should be 0.001 inch or less to insure a material ground fine enough for the next step. The above dimension is the minimum clearance for the equipment used in the examples. One of the major criterion of the instant invention is the small particle size of the final powder. The smaller the particle size, the more dispersible it will be and the better mouthfeel the final beverage product will have. Therefore, we should not be held to the limitations of equipment.

Particle size of the final product of examples 1, 4, and 5 and of full-fat flour were compared by scanning electron microscopy. Measurements of particles magnified 500 times showed that the full-fat flour had particles that appeared as aggregate clusters approximately 75 microns in diameter. The product of example 2, however, consisted of particles having diameters of between 5 and 40 microns.

Homogenizing and emulsifying can be done simultaneously in apparatus such as ultrasonic vibrators, impulse rotary hydromills, high-pressure piston-type, or gear-type homogenizers. The equipment used in the examples was a Manton-Gaulin two-stage homogenizer, which was run at 3,500 p.s.i. The maximum p.s.i. of apparatus is about 5,000 p.s.i. which is also operative for the inventive purpose. At lower p.s.i., about 2,500 the emulsifying action is much less efficient.

Spray drying (Morris B. Jacobs, "Chemistry and Technology of Food and Food Products," Interscience Publishers, Inc., New York, New York, 1951, p. 516 and p. 1,786) was effected in a Bowen-type apparatus at an inlet temperature of 250°–275° F. At 275° F. brown specks appeared in the product which make it unusable for a beverage base. The lower limit of spray drying temperature depends on air flow. A greater air velocity permits the use of lower temperatures. The preferred temperature is between 250° and 265° F. However, because of the flexibility of this type of drying system, the invention should not be limited to this temperature range. The dried product was dry blended with flavorings, sweeteners, vitamins, and minerals, and then stored in closed containers for at least 6 months at elevated temperatures with no deterioration (table 1).

TABLE 1

| Storage | | Flavor score [1] | |
|---|---|---|---|
| Days | ° F. | Initial | Final |
| 56 | 0 | 8.8 | 8.8 |
| | 120 | 8.8 | 8.3 |
| 182 | 0 | 8.8 | 7.9 |
| | 77 | 8.8 | 7.7 |
| | 100 | 8.8 | 7.5 |

[1] Score based on a scale of 0–10.

One part by weight of the dry formulation was mixed with nine parts of water to make the beverage that was tested by the taste panel.

It should be obvious to anyone skilled in the art that the dry protein powder could be used in a variety of ways and formulations.

The dispersibility, as measured by the nitrogen solubility index (NSI), of the final product is improved as much as 300 percent (table 3). The high NSI for final spray-dried product shows that no elaborate mixing means are necessary when water is added to make a beverage.

EXAMPLE 1

Six pounds of full-fat soy flour were slurried with 48 pounds of water and the slurry of about 11 percent by weight flour in water processed through a colloid mill having a clearance of 0.001 inch. The Manton-Gaulin two-stage homogenizer emulsified the milled slurry at 3,500 p.s.i., after which the emulsion was spray dried in a Bowen-type spray dryer at 250°–265° F. inlet air temperature and 150°–160° F. outlet air. The soy protein powdered product had a NSI of 57.2 and a particle size of 5 to 40 microns as measured by scanning electron microscopy.

EXAMPLE 2

Five pounds of defatted soy flour in 40 pounds of water (about 11 percent by weight flour in water) were processed in the same manner as example 1. The final product had a NSI of 49.7.

EXAMPLE 3

Five pounds of full-fat flour were processed in the same manner as in example 1 with the exception that 1.0 pound of hydrogenated soybean oil, m.p. 100°–105° F., and 0.055 pound of polyoxyethylene sorbitan monostearate emulsifier were added to the slurry before colloid milling. Three pounds of the final spray-dried product were blended into the following formulation:

|   |   | Pounds | Percent |
|---|---|---|---|
| (a) | Spray-dried product (3 pounds): | | |
|   | Protein | 1.07 | 32.1 |
|   | Fat (total) | 1.04 | 31.1 |
|   | Carbohydrates | 0.59 | 17.7 |
|   | Fiber, ash | 0.27 | 8.1 |
|   | Emulsifier | 0.03 | 1.0 |
| (b) | Sucrose | 0.245 | 7.3 |
| (c) | Sodium chloride | 0.025 | 0.7 |
| (d) | Vitamin premix,[1] with antioxidant, "Formula No. 2 for use in blended food products for U.S. Government A.I.D. programs" | 0.003 | 0.1 |
| (e) | Mineral premix,[1] CSM Mallinckrodt Chemical Works, St. Louis, Mo. | 0.060 | 1.8 |
| (f) | Flavor compound No. 42022 (cream imitation) Fritzsche, Inc., New York, N.Y. | 0.005 | 0.1 |

[1] See Table 2.

TABLE 2

|   | Percent by weight |
|---|---|
| Mineral premix: | |
| Calcium carbonate, precipitated FCC grade | 46.1 |
| Zinc sulfate, hydrated, FCC (ZnSO$_4$·7H$_2$O) | 0.3 |
| Ferrous fumarate, purified food grade | 1.8 |
| Iodized salt (0.007% I$_2$) food grade | 51.8 |
| Vitamin premix: | |
| Thiamine mononitrate | 1.88 |
| Riboflavin | 2.63 |
| Pyridoxine hydrochloride | 1.13 |
| Niacin | 33.80 |
| Ca D-pantothenate | 18.78 |
| Folacin | 0.22 |
| Vitamin B$_{12}$ | 0.02 |
| Vitamin A (stabilized retinyl palmitate), 15.0 mil. USP units | |
| Vitamin D (stabilized), 1.8 mil. USP units | 11.54 |
| Alpha tocopherol acetate, 14,000.0 IU | |
| Butylated hydroxy anisole | 15.02 |
| Butylated hydroxy toluene | 15.02 |

EXAMPLE 4

Five pounds of defatted flour were processed in the same manner as in example 1 except that 2.68 pounds of hydrogenated soybean oil, m.p. 100°–105° F., and 0.148 pounds of polyoxyethylene sorbitan monostearate emulsifier were added to the recycling flour slurry in the colloid mill. Four pounds of the final spray-dried product were blended into the following formulation:

|   |   | Pounds | Percent |
|---|---|---|---|
| (a) | Spray-dried product (4 pounds): | | |
|   | Protein | 1.41 | 31.7 |
|   | Fat (total) | 1.36 | 30.5 |
|   | Carbohydrates | 0.79 | 17.8 |
|   | Fiber, ash | 0.36 | 8.1 |
|   | Emulsifier | 0.08 | 1.8 |
| (b) | Sucrose | 0.315 | 7.1 |
| (c) | Sodium chloride | 0.035 | 0.8 |
| (d) | Vitamin premix,[1] with antioxidant, "Formula No. 2 for use in blended food products for U.S. Government A.I.D. programs" | 0.004 | 0.1 |
| (e) | Mineral premix,[1] CSM Mallinckrodt Chemical Works, St. Louis, Mo. | 0.086 | 1.9 |
| (f) | Flavor compound No. 42022 (cream imitation) Fritzsche, Inc., New York, N.Y. | 0.008 | 0.2 |

[1] See Table 2.

The final blended product had a NSI of 55.2, and scanning electron micrographs showed particles having diameters between 5 and 40 microns.

Compositions of the starting materials and the final spray-dried products of the four examples are given in table 3. The component labeled "Fiber, ash, moisture" is obtained by difference.

TABLE 3

| Component | Percent by weight of each component | | | | | | |
|---|---|---|---|---|---|---|---|
|  | Full-fat flour | Defatted flour | Ex. 1 | Ex. 2 | Ex. 3 | Ex. 4 | Ex. 5 |
| Protein | 43 | 55 | 43 | 55 | 31.8 | 31.7 | 32.0 |
| Fat | 22 | 0 | 22 | 0 | 31.1 | 30.9 | 31.1 |
| Carbohydrates | 24 | 31 | 24 | 31 | 17.7 | 17.9 | 17.9 |
| Emulsifier |  |  |  |  | 0.9 | 1.7 | 0.8 |
| Fiber, ash, moisture | 11 | 13 | 11 | 13 | 8.1 | 8.0 | 8.2 |
| Sucrose |  |  |  |  | 7.6 | 6.9 | 6.8 |
| Sodium chloride |  |  |  |  | 0.8 | 0.8 | 0.9 |
| Mineral mix |  |  |  |  | 1.9 | 1.9 | 2.0 |
| Vitamin mix |  |  |  |  | 0.1 | 0.1 | 0.1 |
| Flavoring |  |  |  |  | 0.2 | 0.2 | 0.2 |
| NSI | 26.2 | 17.9 | 57.2 | 49.7 | 60.0 | 55.2 | 6.10 |

EXAMPLE 5

Three pounds of full-fat flour, 0.6 pound of hydrogenated soybean oil, 0.03 pound of polyoxyethylene sorbitan monostearate emulsifier, 0.28 pound sugar, and 0.04 pound sodium chloride were mixed with 15.5 pounds of water giving a slurry containing 20 percent by weight solids. The process of example 1 was used to obtain a NSI of 61.0. Two pounds of the final spray-dried product were blended into the following formulation:

|   |   | Pounds | Percent |
|---|---|---|---|
| (a) | Spray-dried product (2 pounds): | | |
|   | Protein | 0.654 | 32.0 |
|   | Fat (total) | 0.635 | 31.1 |
|   | Carbohydrates | 0.365 | 17.9 |
|   | Fiber, ash | 0.167 | 8.2 |
|   | Emulsifier | 0.016 | 0.8 |
| (b) | Sucrose | 0.140 | 6.8 |
| (c) | Sodium chloride | 0.018 | 0.9 |
| (d) | Vitamin premix,[1] with antioxidant, "Formula No. 2 for use in blended food products for U.S. Government A.I.D. programs" | 0.002 | 0.1 |
| (e) | Mineral premix,[1] CSM Mallinckrodt Chemical Works, St. Louis, Mo. | 0.042 | 2.0 |
| (f) | Flavor compound No. 42022 (cream imitation) Fritzsche, Inc., New York, N.Y. | 0.004 | 0.2 |

[1] See Table 2.

The beverage powder produced in this example contained particles having diameters between 5 and 40 microns as shown by scanning electron micrograph measurements.

We claim:

1. A process for the preparation of a stable, water-dispersible, dried soybean protein powder comprising:
   a. dispersing soybean protein flour in water to make a slurry containing up to about 20 percent solids;
   b. reducing particle size of the flour to about 5 to 40 microns in diameter by wet milling;
   c. homogenizing and emulsifying the resulting wet-milled slurry; and
   d. spray drying the resulting emulsion;

said dried soybean protein powder having an NSI of from 50 to 61 and the ability to withstand storage in closed containers at temperatures as high as 100° F. for periods of up to 6 months without significant deterioration.

2. A process as described in claim 1 in which the soybean protein flour is full-fat soybean protein flour.

3. A process as described in claim 2 in which vegetable fat, flavorings, and an emulsifier are added to the slurry prior to wet milling.

4. A process as described in claim 1 in which the soybean protein flour is defatted soybean protein flour.

5. A process as described in claim 4 in which vegetable fat, flavorings, and an emulsifier are added to the slurry prior to wet milling.

* * * * *